(12) United States Patent
Jeong et al.

(10) Patent No.: US 11,982,756 B2
(45) Date of Patent: May 14, 2024

(54) DEVICE AND METHOD FOR POSITIONING BASED ON HETEROGENEOUS NETWORKS

(71) Applicants: HYUNDAI MOTOR COMPANY, Seoul (KR); KIA CORPORATION, Seoul (KR); KOOKMIN UNIVERSITY INDUSTRY ACADEMY COOPERATION FOUNDATION, Seoul (KR)

(72) Inventors: Gu Min Jeong, Seoul (KR); Hyun Jung Oh, Seoul (KR); Seung Hyeon Lee, Seoul (KR); Yo Cheol Jang, Suwon-si (KR); Choong Yub Lee, Seoul (KR); Jongmyung Park, Seoul (KR); Dong Hee Seok, Seoul (KR); Jae Jun Ha, Hwaseong-si (KR)

(73) Assignees: HYUNDAI MOTOR COMPANY, Seoul (KR); KIA CORPORATION, Seoul (KR); KOOKMIN UNIVERSITY INDUSTRY ACADEMY COOPERATION FOUNDATION, Seoul (KR)

( * ) Notice: Subject to any disclaimer, the term of this patent is extended or adjusted under 35 U.S.C. 154(b) by 253 days.

(21) Appl. No.: 17/519,363

(22) Filed: Nov. 4, 2021

(65) Prior Publication Data
US 2022/0397630 A1 Dec. 15, 2022

(30) Foreign Application Priority Data

Jun. 11, 2021 (KR) .................... 10-2021-0076174

(51) Int. Cl.
*G01S 5/00* (2006.01)
*H04B 17/318* (2015.01)
*H04W 4/029* (2018.01)

(52) U.S. Cl.
CPC .......... *G01S 5/0036* (2013.01); *H04B 17/318* (2015.01); *H04W 4/029* (2018.02)

(58) Field of Classification Search
None
See application file for complete search history.

(56) References Cited

U.S. PATENT DOCUMENTS

2021/0321219 A1* 10/2021 Rauhala .............. H04W 64/003

\* cited by examiner

*Primary Examiner* — Adolf Dsouza
(74) *Attorney, Agent, or Firm* — Lempia Summerfield Katz LLC

(57) ABSTRACT

A method, implemented by a computer, for determining a position of a personal mobility device (PMD) comprises: estimating a position of a PMD based on a first wireless signal; determining whether the PMD is within an intermediate area between a first area and a second area, based on an estimated position of the PMD; determining whether the PMD moves to the second area, by using both the first wireless signal and a second wireless signal; and determining position of the PMD by using any one of the first wireless signal and the second wireless signal based on a movement of the PMD to the second area.

18 Claims, 5 Drawing Sheets

DEVICE AND METHOD FOR POSITIONING BASED ON HETEROGENEOUS NETWORKS

CROSS-REFERENCE TO RELATED APPLICATION

This application claims priority to and the benefit of Korean Patent Application Number 10-2021-0076174, filed on Jun. 11, 2021, the entire contents of which are incorporated herein by reference.

FIELD

The present disclosure relates to a device and method for accurately estimating the position of a personal mobility device (PMD).

BACKGROUND

The statements in this section merely provide background information related to the present disclosure and do not necessarily constitute prior art.

In recent years, the importance of cars as transportation means is decreasing, and the importance of a personal mobility devices (PMDs) is increasing. Here, the PMD is a movable means for transporting one or more people. For example, an electric kickboard, a bike, a smart car, a vehicle, a purpose built vehicle (PBV), an aerial vehicle, etc.

As the PMD becomes popular, various services for PMD are now under development. In particular, location-based services are mainly being developed.

In general, Global Navigation Satellite System (GNSS), a system based on satellite signals, is used to locate PMDs. One example of a GNSS is the Global Positioning System (GPS). A vehicle-to-everything (V2X) standard technology applied to intelligent traffic systems also estimates the position of a PMD based on GPS.

Global Positioning System (GPS) is a positioning technology globally used and is one of the most used positioning systems. However, accuracy of positioning may drop in urban areas with lots of high-rise buildings due to the diffuse reflection of GPS signals. In addition, positioning a PMD in a GPS dead zone, such as an indoor parking lot, is difficult since satellite signals can hardly reach there.

In order to solve such problems, further researches on positioning a PMD have been actively made. These researches use wireless network technology and surrounding infrastructure.

The positioning method using the wireless network technology can estimate the position of the PMD by using various types of wireless networks depending on the surrounding infrastructure. For example, positioning can be done by checking connection with wireless local area network AP (Access Point), whose location is already known.

However, we have discovered that when different types of wireless networks are mixed, communication methods and characteristics between the networks are different. Thus the positioning accuracy may vary depending on the wireless network used to estimate the position of PMDs. In particular, movement of the PMDs between wireless network areas occurs more frequently than cars because the PMDs can travel not only on car roads but also on sidewalks and also can make fast turns and travel on complex routes, etc.

SUMMARY

In one form, a method, implemented by a computer, for positioning based on heterogeneous networks comprises: estimating a position of a personal mobility device (PMD) based on a first wireless signal; determining whether the PMD is within an intermediate area between a first area and a second area, based on an estimated position of the PMD; determining whether the PMD moves to the second area, by using both the first wireless signal and a second wireless signal; and determining position of the PMD by using any one of the first wireless signal and the second wireless signal based on a movement to the second area.

In another form of the present disclosure, a heterogeneous network based positioning device comprises: a communication unit for receiving at least one of a first wireless signal and a second wireless signal; and a control unit for estimating a position of a PMD based on the first wireless signal, determining whether the PMD is within an intermediate area between a first area and a first area based on an estimated position of the PMD, determining, based on both the first wireless signal and the second wireless signal, whether the PMD moves to the second area, and determining the location of the PMD based on either one of the first wireless signal and the second wireless signal depending on whether the movement is to the first area.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
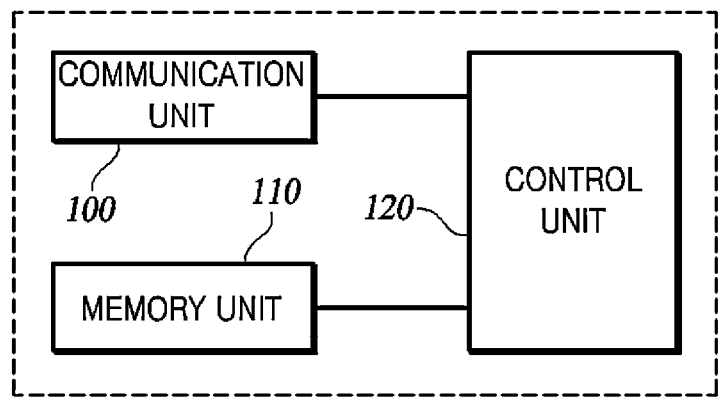
FIG. 1 is a diagram illustrating a configuration diagram of a heterogeneous network based positioning device in accordance with an embodiment of the present disclosure.

The drawings described herein are for illustration purposes only and are not intended to limit the scope of the present disclosure in any way.

DETAILED DESCRIPTION

Hereinafter, some embodiments of the present disclosure are described with reference to the drawings. It should be noted that in giving reference numerals to components of the accompanying drawings, the same or equivalent components are denoted by the same reference numerals even when the components are illustrated in different drawings. In describing the present disclosure, when determined that a detailed description of related known functions or configurations may obscure the subject matter of the present disclosure, the detailed description thereof has been omitted.

In addition, in describing the components of the present disclosure, terms such as first, second, A, B, (a), (b), etc. may be used. These terms are used only in order to distinguish any component from other components, and features, sequences, or the like, of corresponding components are not limited by these terms. Throughout the present specification, unless explicitly described to the contrary, "including" and "comprising" any components should be understood to imply the inclusion of other elements rather than the exclusion of any other elements. A term, such as "part," "module," or the like described in the specification, means a unit of processing at least one function or operation and may be implemented as hardware (e.g., a processor) or software or a combination of hardware and software. When a component, device, element, or the like of the present disclosure is described as having a purpose or performing an operation, function, or the like, the component, device, or element should be considered herein as being "configured to" meet that purpose or to perform that operation or function.

In the following, a personal mobility device (hereinafter 'PMD') is a movable object or a personal transporter. For example, types of the PMD include personal mobility vehicle (PM vehicle), micro mobility vehicle, electric bicycle, electric kickboard, electric scooter, electric wheelchair, electric bike, 2-wheel drive, smart car, shuttle, personal movement means, personal flight means, smart mobility, shared mobility, First Mile, Last Mile, PAV (Purpose Built Vehicle), PAV (Personal Air Vehicle), car, electric car, motor vehicle, passenger automobile, alternative fuel vehicle and etc.

A positioning device may be a server located outside of the PMD. Further, the positioning device may be a device located inside of the PMD, a mobile terminal of a user, and etc. The positioning device can store at least one of the following in advance; a virtual map, identification information of the road side unit, a position coordinate corresponding to the identification information, identification information of a PMD, or subscriber information of a user. Here, the position coordinate is latitude and longitude or a two-dimensional or three-dimensional coordinate based on a specific point. The positioning device in the following is attached to the PMD.

Intelligent Transport System (ITS) also includes a Road Side Unit (RSU) or a mobile communication station. The road side units or mobile communication stations all perform broadcasting. If desired, the terminology between the road side unit and the mobile communication station may be interchangeable.

In addition, although the following description is made with reference to a Received Signal Strength Indicator (RSSI), the positioning device may use timing measurement data to estimate the position of the PMD. Here, the timing measurement data means at one of the following; a Round Trip Time (RTT), a Time of Flight (ToF), a time of arrival (ToA), and a Time Difference of Arrival (TDoA). Further, the positioning device can estimate the position of the PMD by using an Angle of Arrival (AoA), One Way Ranging (OWR), Two Way Ring (TWR), or the like.

FIG. 1 is a diagram illustrating a configuration diagram of a heterogeneous network based a positioning device in accordance with an embodiment of the present disclosure.

Referring to FIG. 1, a positioning device 10 based on heterogeneous networks includes a communication unit 100, a memory unit 110, and a control unit 120. The positioning device 10 or a PMD equipped with the positioning device 10, may further include a sensing unit (not shown) or a power unit (not shown). The sensing unit may include a GPS module, a camera, a vision sensor, etc., and the power unit may include a battery, etc. In the following, the first area and the second area are areas where wireless signal is present.

The communication unit 100 performs communication with road side units. The communication unit 100 may receive a first wireless signal from the road side units located in the first area, may receive a second wireless signal from the road side units located in the second area, or receive both signals simultaneously. In the present disclosure, a signal indicates a single signal or a plurality of signals. The number of the plurality of signals may be greater than or equal to the minimum number required for positioning of the PMD. For example, the first wireless signal indicates at least three first wireless signals received from at least three road side units.

The communication unit 100 may communicate with a server either directly or through road side units.

The communication unit 100 may include one or more components that enable communication with an external device, and may simultaneously use at least two communication methods. The communication method may be divided into one of the following; a near field communication module and a wireless communication module. Any communication method may be applied as long as the communication method is capable of positioning the transport device. Specific types of communication methods are as follows.

The short range communication module may include various short range communication modules that transmit and receive signals by using a wireless communication network in a short range, such as a Bluetooth module, an infrared communication module, a Radio Frequency Identification (RFID) communication module, an Ultra-Wide Band (UWB), a Wireless Local Access Network (WLAN) communication module, a NFC communication module, a Bluetooth communication module, BLE communication module, Zigbee communication module, and etc. The wireless communication module may include a wireless communication module that supports various wireless communication methods, such as vehicle-to-everything (V2X), Cellular-V2X (C-V2X), 5G-V2X, Wireless Access in Vehicle Environment (WAVE), Dedicated Short Range Communication (DSRC), Wi-Fi module, Long Term Evolution (LTE), New Radio (NR), and etc. In the following, a message means a message used in each wireless communication.

The memory unit 110 is a component that stores information desired for positioning the PMD. In accordance with an embodiment of the present disclosure, the memory unit 110 may store information of an intermediate area between the two network areas, the first area and the second area. The memory unit 110 may store a map and store an intermediate area predetermined in the map. The memory unit 110 may store a boundary line between the first area and the second area of the map. Here, a map may be a GPS map or a high-definition map. In addition, the memory unit 110 may store the estimated positions of the PMD to derive the path history of the PMD.

The control unit 120 determines in which of the first area, the intermediate area, and the second area the PMD is located, determines wireless signal to be used for positioning the PMD on the basis of the determined areas, and determines the position of the PMD based on the determined wireless signal.

The following describes a main operation in which the positioning device 10 determines wireless signal used for positioning a PMD in a heterogeneous network environment and determines the position of the PMD.

When the first wireless signal is received from the road side units in the first area by the communication unit 100, the control unit 120 estimates the position of the PMD based on the first wireless signal.

In accordance with an embodiment of the present disclosure, the control unit 120 determines whether the PMD is in the intermediate area based on the estimated position of the PMD.

When it is difficult to determine whether the PMD is in the intermediate area, the control unit 120 maps the estimated position on a detailed map. in accordance with a boundary line between the first area and the second area on the detailed map, the control unit 120 can determine where the PMD is located, either on the first area or the second area.

When the PMD is in the intermediate area, the communication unit 100 receives the first wireless signal from the road side units in the first area, and receives the second wireless signal from the road side units of the second area.

The control unit 120 determines whether the PMD moves to the second area based on the first wireless signal and the second wireless signal. The control unit 120 may determine whether the PMD moves to the second area based on a position estimated from the wireless signal or based on the strength of the wireless signal.

The control unit 120 determines the position of the PMD based on either the first wireless signal or the second wireless signal depending on whether it has moved to the second area. When it is determined that the PMD has moved to the second area, the control unit 120 determines the position of the PMD based on the second wireless signal. When it is determined that the PMD has not moved to the second area, the control unit 120 determines the position of the PMD based on the first wireless signal.

The control unit 120 can map the determined position of the PMD to the detailed map. The control unit 120 can print the detailed map, to which the position of the PMD is mapped, to the user.

The positioning device 10 can accurately estimate the position of the PMD by determining a network region and a wireless signal to be used for estimating the position in a heterogeneous network environment in accordance with the embodiment of the present disclosure.

Specific criteria for determining whether the control unit 120 is in the intermediate area or is moving to the second area is described below in detail with reference to FIGS. 2A, 2B, and 2C.

Figure 2A:
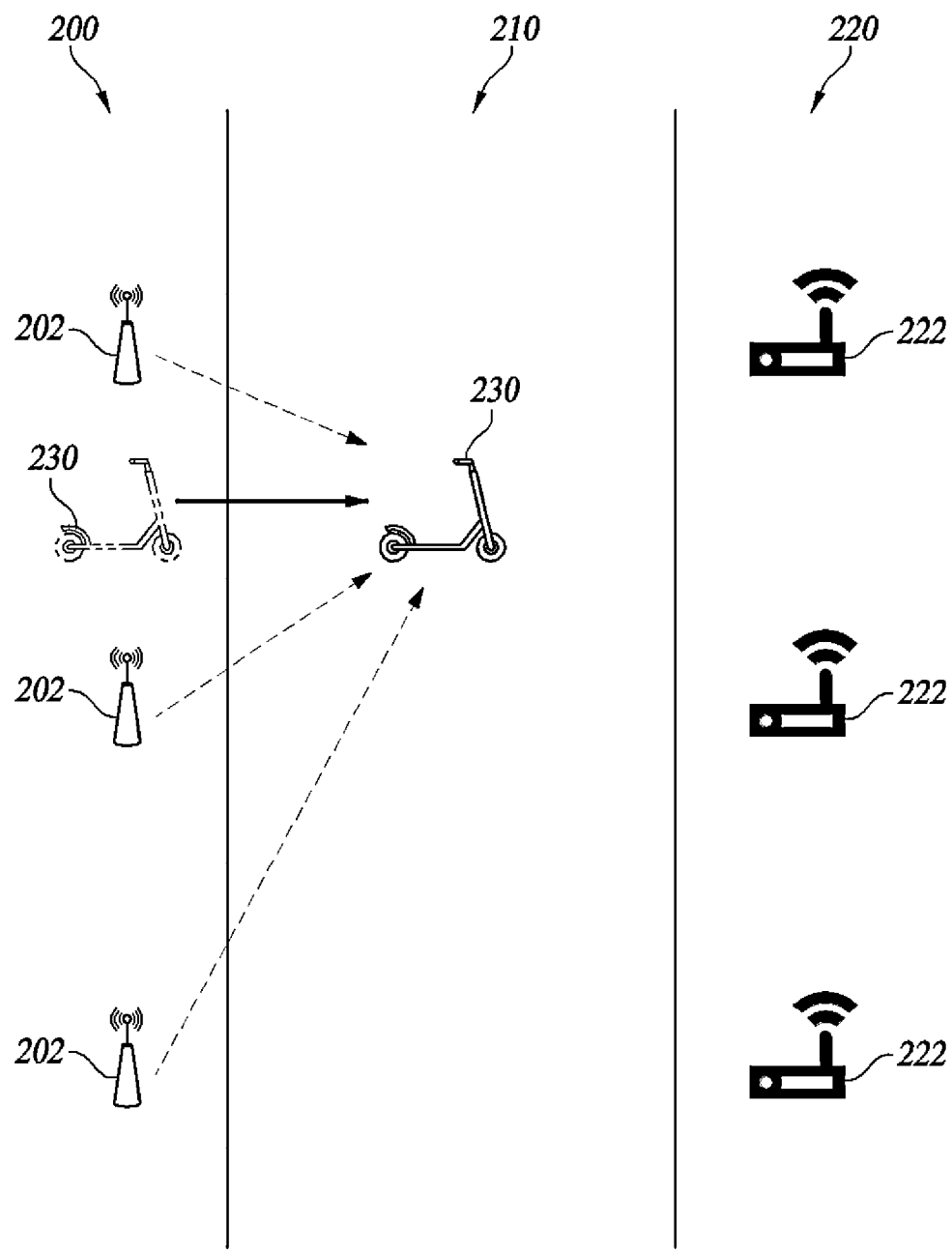
FIGS. 2A, 2B, and 2C are diagrams illustrating a control method of a heterogeneous network based positioning device in accordance with an embodiment of the present disclosure.
Figure 2B:
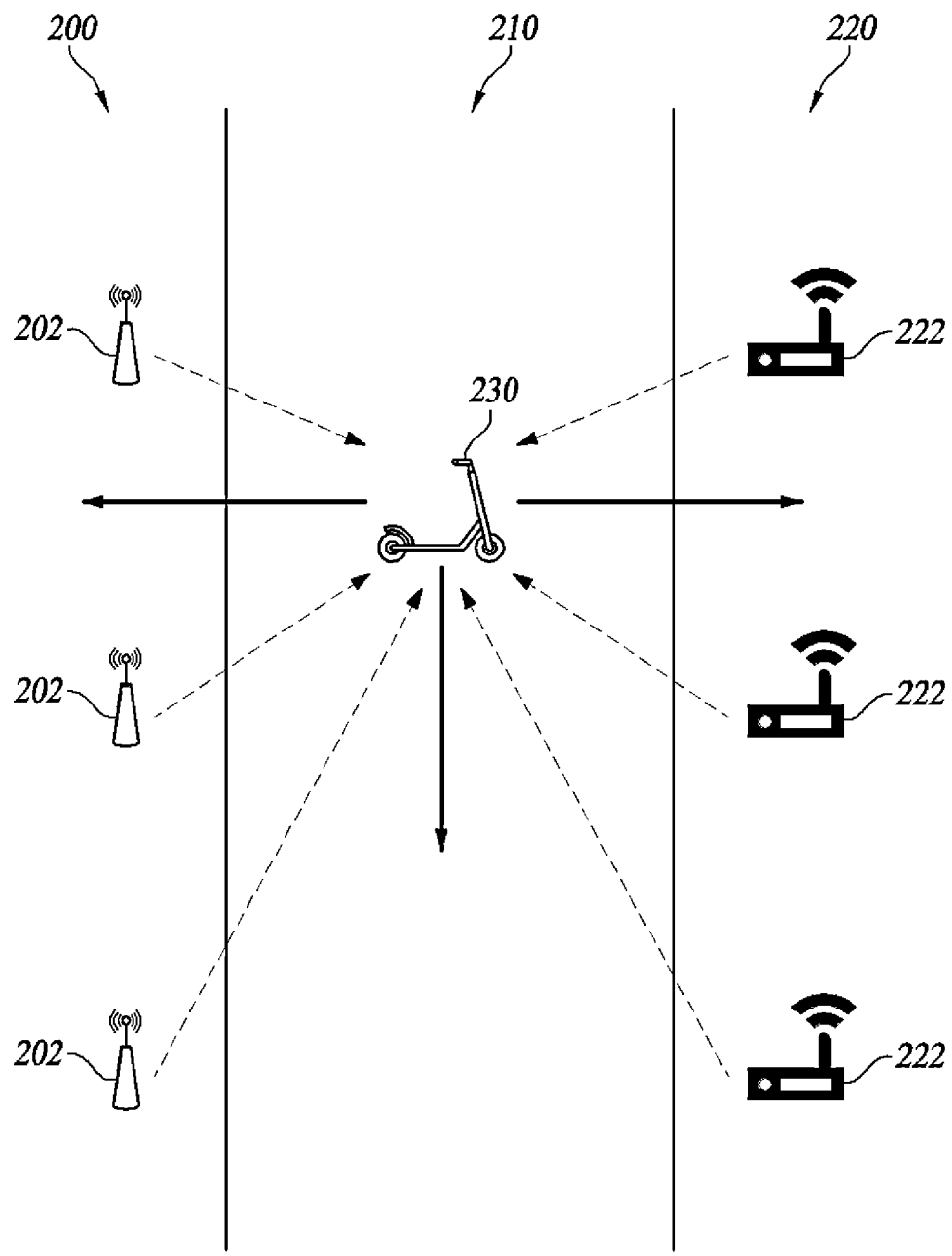
Figure 2C:
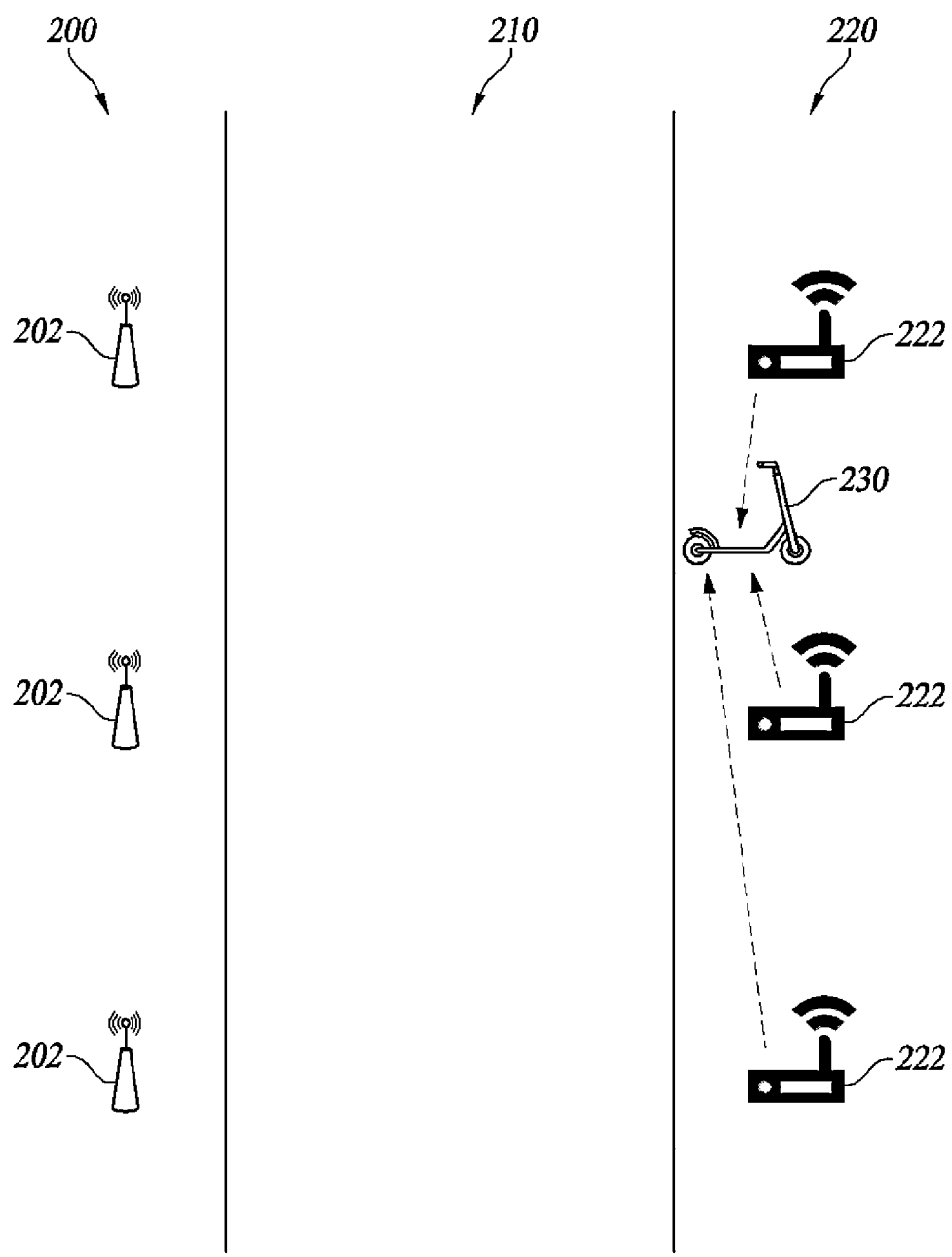

FIGS. 2A, 2B, and 2C are diagrams illustrating a control method of a heterogeneous network based positioning device in accordance with an embodiment of the present disclosure.

FIGS. 2A, 2B, and 2C show a first area 200, an intermediate area 210, a second area 220, a first road side unit 202, a second road side unit 222, and a PMD 230. A positioning device (not shown) is described as being attached to the PMD 230.

The first area 200 and the second area 220 refer to network areas in which the first road side unit 202 and second road side unit 222 are respectively installed. The first area and the second area refer to areas in which only one type of wireless signal is present, or in which the strength of one type of wireless signal is significantly stronger than the strength of other types of wireless signal. For example, the first area 200 may be an area where a V2X signals is received, and the second area 220 may be an area where UWB signals are received. Another example is the first area 200 being an area in which a UWB signal is received, and the second area 220 being an area where a V2X signal is received.

The intermediate area 210 is the area between the first area 200 and the second area 220. The intermediate area 210 refers to an area in which different types of wireless signals coexist and the difference in signal strength is not large. In accordance with an embodiment of the present disclosure, the intermediate area 210 may be a predetermined area. The intermediate area 210 may be an area predetermined on a map or a detailed map (HD map).

The first road side unit 202 and the second road side unit 222 continuously transmit wireless signals, and the positioning device continuously receives wireless signals in the reception range.

Referring again to FIG. 2A, the PMD 230 travels from the first area 200 to the intermediate area 210. When the PMD 230 is in the first area 200, the positioning device receives the first wireless signal from the first road side unit 202, and estimates the position of the PMD 230 based on the first wireless signal. As the position estimation method, various position estimation techniques such as triangulation, multilateration, fingerprint map method, and the like may be utilized.

The positioning device determines whether the PMD 230 is within the intermediate area 210 based on the estimated position.

In accordance with an embodiment of the present disclosure, the positioning device determines that the PMD 230 is in the intermediate area 210 when the estimated position based on the first wireless signal is in the intermediate area 210.

In accordance with another embodiment of the present disclosure, the positioning device checks a boundary line separating the first area 200 and the intermediate area 210, and determines that the PMD 230 is in the intermediate area 210 based on whether the boundary line intersects a path history of the PMD 230. When the positioning device is powered on in the intermediate area 210 and the position estimation error of the PMD 230 is large, the positioning device can use the path history to determine whether the PMD 230 is in the intermediate area 210.

When the positioning device determines that the PMD 230 continues to exist in the first area 200, it estimates the position of the PMD 230 based on the first wireless signal.

Referring to FIG. 2B, when the positioning device determines that the PMD 230 is in the intermediate area 210, it receives the first wireless signal from the first road side unit 202 and receives the second wireless signal from the second road side unit 222. However, the positioning device can receive the second wireless signal even before the PMD 230 moves to the intermediate area 210.

The positioning device determines whether the PMD 230 moves to the second area 220 based on the first wireless signal and the second wireless signal.

In accordance with an embodiment of the present disclosure, the positioning device determines whether the PMD 230 moves to the second area 220 based on the first position estimated by the first wireless signal or the second position estimated by the second wireless signal.

In accordance with an embodiment of the present disclosure, the positioning device determines that the PMD 230 has not moved to the second area 220 when either the first position or the second position is within the first area 200. That is, the positioning device determines that the PMD 230 has returned to the first area 200 again. Conversely, the positioning device determines that the PMD 230 has moved to the second area 220 when either the first position or the second position is in the second area.

In accordance with an embodiment of the present disclosure, the positioning device determines that the PMD 230 has moved to the second area 220 based on whether both of the first position and the second position are within the second area 220. Embodiments in which the positioning device uses both the first position and the second position may be more advantageous for final position estimation of the PMD 230 than embodiments in which it uses either one of the first or the second position.

Meanwhile, in accordance with an embodiment of the present disclosure, the positioning device determines whether the PMD 230 moves to the second area 220 based on the strength of the first wireless signal and the second wireless signal.

In accordance with an embodiment of the present disclosure, the positioning device determines that the PMD 230 has not moved to the second area 220 when the average value of the strength of the first wireless signal and the second wireless signal are constant. That is, the positioning device determines that the PMD 230 travels between the first area 200 and the second area 220, and determines that it does not move to the second areas 220. The average value of the signal strength may be determined in accordance with the number of measured signal strengths or may be time-dependent. The expression "average value is constant" includes minute changes in the average value.

In accordance with an embodiment of the present disclosure, the positioning device determines that the PMD 230 has not moved to the second area 220 when the strength of the first wireless signal increases and the strength of the second wireless signal decreases. Conversely, the positioning device determines that the PMD 230 has moved to the second area 220 when the strength of the first wireless signal decreases and the strength of the second wireless signal increases.

Depending on whether the PMD 230 moves to the second area 220, the positioning device determines the position of the PMD 230 based on either the first wireless signal or the second wireless signal.

When the positioning device determines that the PMD 230 has not moved to the second area 220, the positioning device determines the position of the PMD 230 based on the first wireless signal.

In other words, when it is determined that the PMD 230 has moved to the first area 200, the positioning device can estimate the position of the PMD 230 based on the first wireless signal. When the positioning device determines that the PMD 230 continues to stay in the intermediate area 210, the positioning device can estimate the position of the PMD 230 by using the stronger signal among the first wireless signal and the second wireless signal. When the positioning device determines that the PMD 230 continues to stay in the intermediate area 210, the positioning device can use a wireless signal with less change in signal strength or with less change in the estimated position.

Referring to FIG. 2C, when the positioning device determines that the PMD 230 has moved to the second area 220, the positioning device determines the position of the PMD 230 based on the second wireless signal.

In the heterogeneous network environment, the positioning device can accurately estimate the position of the PMD 230 by determining the network area that is used to estimate position. In particular, the positioning device can accurately estimate the position of the PMD 230 when the PMD 230 enters in and out of a building frequently or in an indoor environment where a GPS signal is not received.

Figure 3:
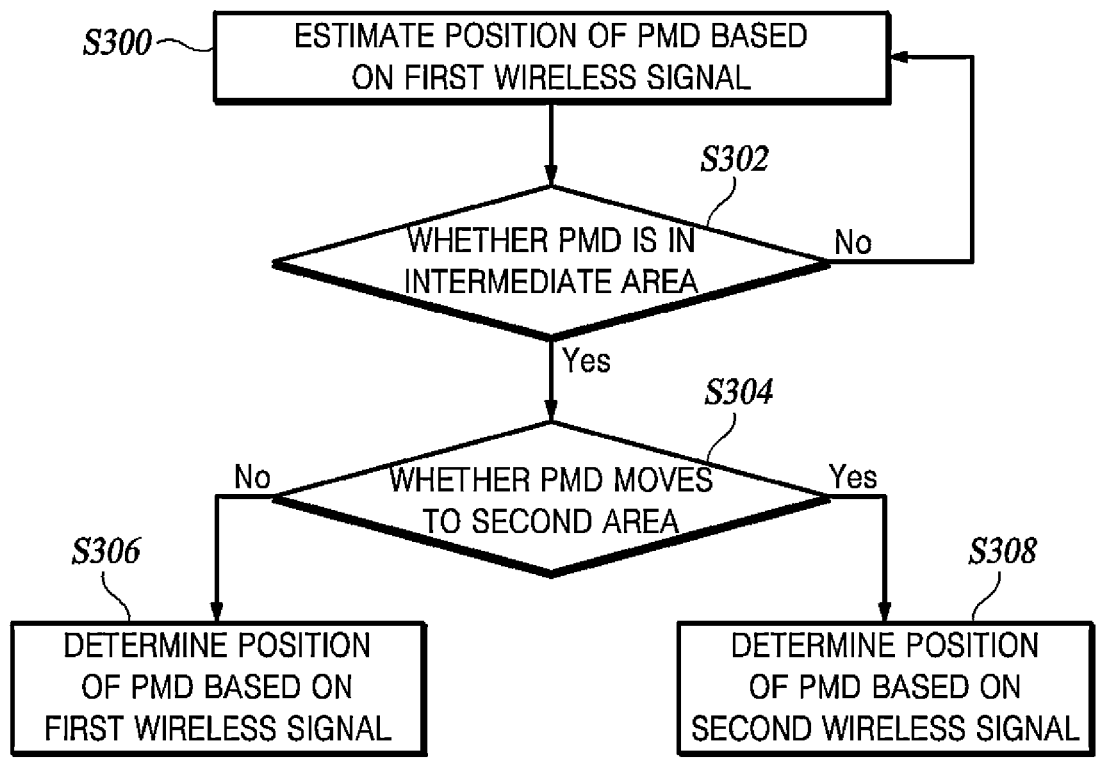
FIG. 3 is a flow diagram illustrating a heterogeneous network based positioning method in accordance with an embodiment of the present disclosure.

FIG. 3 is a flowchart illustrating a heterogeneous network based positioning method in accordance with an embodiment of the present disclosure.

Referring to FIG. 3, the positioning device estimates the position of the PMD based on the first wireless signal (S300).

The positioning device determines whether the PMD is in the intermediate area, between the first area and the second area, based on the estimated position of the PMD (S302).

In accordance with an embodiment of the present disclosure, the intermediate area may be a predetermined area between the first area and the second area.

In accordance with an embodiment of the present disclosure, the positioning device can determine that the PMD is in the intermediate area based on whether the boundary line separating the first area and the intermediate area intersects the path history of the PMD.

When it is determined that the PMD is not located in the intermediate area, that is, when it is judged that the PMD is in the first area, the positioning device estimates the position of the PMD based on the first wireless signal.

When it is determined that the PMD is in the intermediate area, the positioning device determines whether the PMD moves to the second area based on the first wireless signal and the second wireless signal (S304).

In accordance with an embodiment of the present disclosure, the positioning device determines whether the PMD moves to the second area based on one of the first position, estimated by the first wireless signal, and the second position, estimated by the second wireless signal.

Specifically, when either the first position or the second position is within the first area, the positioning device can determine that the PMD has not moved to the second area. When either the first position or the second position is in the second area, the positioning device can determine that the PMD has moved to the second area. The positioning device can determine that the PMD has moved to the second area based on whether both the first position and the second position are within the second area.

In accordance with another embodiment of the present disclosure, the positioning device can determine whether the PMD moves to the second area based on the strength of the first wireless signal and the second wireless signal.

Specifically, when the average values of the strength of the first wireless signal and the second wireless signal are constant, the positioning device may determine that the PMD has not moved to the second area.

The positioning device can determine that the PMD has not moved to the second area when the strength of the first wireless signal increases and the strength of the second wireless signal decreases. Conversely, the positioning device can determine that the PMD has moved to the second area when the strength of the first wireless signal decreases and the strength of the second wireless signal increases.

The positioning device determines the position of the PMD based on one of the first wireless signal or the second wireless signal, depending on whether it has moved to the second area.

When it is determined that the PMD has not moved to the second area, the positioning device determines the position of the PMD based on the first wireless signal (S306).

When it is determined that the PMD has moved to the second area, the positioning device determines the position of the PMD based on the second wireless signal (S308).

Although it is described in FIG. 3 that operations S300 to S308 are sequentially executed, this merely illustrates the technical idea of an embodiment of the present disclosure. In other words, those having ordinary skill in the technical field to which an embodiment of the present disclosure belongs may change the order described in FIG. 3 within a range that does not deviate from the essential characteristics of an embodiment of the present disclosure. Alternatively, those having ordinary skill in the technical field may apply various modifications and variations to execute one or more of the operations S300 to S308 in parallel. Thus, FIG. 3 is not limited to a time-series order. The above modifications and variations should be within the scope of the present disclosure.

Meanwhile, the operations illustrated in FIG. 3, as well as the apparatus including the various units identified above and in FIG. 1, can be implemented as computer-readable codes on a computer-readable recording medium. The computer readable recording medium may include all kinds of recording apparatuses in which data that may be read by a computer system is stored. In other words, the computer-readable recording medium may be a non-transitory medium, such as a read-only memory (ROM), a random-access memory (RAM), a compact disc (CD)-ROM, a magnetic tape, a floppy disk, and an optical data storage device. The computer readable recording medium may further include a transitory medium such as a carrier wave (for example, transmission over the Internet) and a data transmission medium. In addition, the computer readable recording media may be distributed in computer systems connected to each other through a network such that the computer readable codes may be stored and executed in the computer readable recording media in a distributed scheme.

In addition, components of the present disclosure may use an integrated circuit structure, such as a memory, a processor, a logic circuit, a look-up table, and the like. These integrated circuit structures execute each of the functions described herein through the control of one or more microprocessors or other control devices. In addition, components of the present disclosure may be specifically implemented by a program or a portion of a code that includes one or more executable instructions for performing a specific logical function and is executed by one or more microprocessors or other control devices. In addition, components of the present disclosure may include or be implemented as a Central Processing Unit (CPU), a microprocessor, and the like that performs respective functions. In addition, components of the present disclosure may store instructions executed by one or more processors in one or more memories.

Although embodiments of the present disclosure have been described for illustrative purposes, those having ordinary skill in the art should appreciate that various modifications, additions, and substitutions are possible, without departing from the idea and scope of the present disclosure. Therefore, embodiments of the present disclosure have been described for the sake of brevity and clarity. The scope of the technical idea of the present embodiments is not limited by the illustrations. Accordingly, those having ordinary skill should understand the scope of the present disclosure should not be limited by the above explicitly described embodiments but by the claims and equivalents thereof.

As described above, according to the embodiment of the present disclosure, it is possible to accurately estimate the position of a PMD by clarifying the criteria for estimating the position of the PMD based on which network area at the boundary between the first network area and the second network area.

As described above, according to another embodiment of the present disclosure, it is possible to inhibit or prevent the mobile unit from estimating the location of the PMD based on the other network area even though it has not moved to another network area by clarifying the criteria for judging that the PMD has not moved from the current network area to another network area.

What is claimed is:

1. A method for positioning based on heterogeneous networks, the method comprising:
   estimating a position of a personal mobility device (PMD) based on a first wireless signal;
   determining whether the PMD is within an intermediate area between a first area and a second area based on the estimated position of the PMD;
   determining whether the PMD moves to the second area by using the first wireless signal and a second wireless signal; and
   determining the position of the PMD by using any one of the first wireless signal and the second wireless signal based on a movement of the PMD to the second area,
   wherein determining the position of the PMD includes:
     determining the position of the PMD based on the second wireless signal when it is determined that the PMD has moved to the second area; and
     determining the position of the PMD based on the first wireless signal when it is determined that the PMD has not moved to the second area.

2. The method of claim 1, wherein the intermediate area is a predetermined area between the first area and the second area.

3. The method of claim 1, wherein the determining whether the PMD is within the intermediate area includes:
   determining that the PMD is within the intermediate area based on whether a boundary line that divides the first area and the intermediate area intersects a path history the PMD.

4. The method of claim 1, wherein the determining whether the PMD moves to the second area includes:
   determining whether the PMD moves to the second area based on at least one of a first position estimated by using the first wireless signal and a second position estimated by using the second wireless signal.

5. The method of claim 4, wherein the determining whether the PMD moves to the second area includes:
   determining that the PMD has not moved to the second area when either the first position or the second position is within the first area; and
   determining that the PMD has moved to the second area when either one of the first and second positions is within the second area.

6. The method of claim 4, wherein the determining whether the PMD moves to the second area includes:
   determining whether the PMD has moved to the second area based on whether the first position and the second position are both within the second area.

7. The method of claim 1, wherein the determining whether the PMD moves to the second area includes:
   determining whether the PMD is moving to the second area based on a strength of the first wireless signal and a strength of the second wireless signal.

8. The method of claim 7, wherein the determining whether the PMD moves to the second area includes:
   determining that the PMD has not moved to the second area when an average of the strength of the first wireless signal and an average of the strength of the second wireless signal are constant.

9. The method of claim 7, wherein the determining whether the PMD moves to the second area includes:

determining that the PMD has not moved to the second area when the strength of the first wireless signal is increased and the strength of the second wireless signal is decreased; and determining that the PMD has moved to the second area when the strength of the first wireless signal is decreased and the strength of the second wireless signal is increased.

10. A heterogeneous network based positioning device, comprising:

at least one memory configured to store computer-executable instructions; and
 at least one processor,
 wherein the at least one processor is configured to execute the computer-executable instructions to:
  estimate a position of a personal mobility device (PMD) based on a first wireless signal,
  determine whether the PMD is within an intermediate area between a first area and a second area based on the estimated position of the PMD,
  determine, based on both the first wireless signal and a second wireless signal, whether the PMD moves to the second area,
  determine the location of the PMD based on either one of the first wireless signal and the second wireless signal depending on whether the PMD moves to the second area,
  determine the position of the PMD based on the second wireless signal when it is determined that the PMD has moved to the second area, and
  determine the position of the PMD based on the first wireless signal when it is determined that the PMD does not move to the second area.

11. The device of claim 10, wherein the intermediate area is a predetermined area between the first area and the second area.

12. The device of claim 10, wherein the at least one processor is configured to determine that the PMD is in the intermediate area based on whether a boundary line separating the first area from the intermediate area intersects a path history of the PMD.

13. The device of claim 10, wherein the at least one processor is configured to determine whether the PMD moves to the second area based on at least one of a first position estimated by the first wireless signal and a second position estimated by the second wireless signal.

14. The device of claim 13, wherein the at least one processor is configured to determine that:

the PMD has not moved to the second area in case where either the first position or the second position is within the first area; and
 the PMD has moved to a second area of the PMD in case where any one of the first and second positions is within the second area.

15. The device of claim 13, wherein the at least one processor is configured to determine that the PMD has moved to the second area based on whether both a first location and a second location are in the second area.

16. The device of claim 10, wherein the at least one processor is configured to determine whether the PMD moves to the second area based on a strength of the first wireless signal and a strength the second wireless signal.

17. The device of claim 16, wherein the at least one processor is configured to determine that the PMD does not move to the second area when an average of the strength of the first wireless signal and an average of the strength of the second wireless signal are constant.

18. The device of claim 16, wherein the at least one processor is configured to determine that:

the PMD has not moved to the second area when the strength of the first wireless signal increases and the strength of the second wireless signal decreases, and
 the PMD has moved to the second area when the first wireless signal strength decreases and the second wireless signal strength increases.

* * * * *